(12) United States Patent
Yoon et al.

(10) Patent No.: US 7,324,169 B2
(45) Date of Patent: Jan. 29, 2008

(54) PROJECTION OPTICAL SYSTEM, PROJECTION TELEVISION, AND METHOD OF MANUFACTURING LENS INCLUDED IN PROJECTION OPTICAL SYSTEM

(75) Inventors: Seok-il Yoon, Daejeon Maetropolitan (KR); Sung-gi Kim, Suwon-si (KR); Gyu-hwan Hwang, Gyeonggi-do (KR); Young-Il Kah, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 10/882,148

(22) Filed: Jul. 1, 2004

(65) Prior Publication Data

US 2005/0083588 A1   Apr. 21, 2005

(30) Foreign Application Priority Data

Jul. 1, 2003     (KR) .................. 10-2003-0044250
Feb. 20, 2004    (KR) .................. 10-2004-0011330

(51) Int. Cl.
*H04N 9/31* (2006.01)
*H04N 5/74* (2006.01)
*H04N 9/14* (2006.01)

(52) U.S. Cl. .............. 348/779; 348/781; 348/786; 348/744; 348/756; 353/119; 353/122; 359/754; 359/649

(58) Field of Classification Search ............ 348/779, 348/786, 756, 778, 781, 744; 359/649, 778, 359/671; 313/364, 371, 437, 474, 478, 479
See application file for complete search history.

(56) References Cited

U.S. PATENT DOCUMENTS

| | | | | |
|---|---|---|---|---|
| 4,013,348 A | * | 3/1977 | Yamada ............ 359/723 |
| 5,055,922 A | * | 10/1991 | Wessling ............ 348/779 |
| 5,065,071 A | | 11/1991 | Donofrio et al. |
| 5,066,113 A | * | 11/1991 | Nakajima et al. ...... 359/649 |
| 5,144,417 A | * | 9/1992 | Tsukagoshi et al. ..... 348/786 |
| RE34,131 E | * | 11/1992 | Vriens et al. ......... 313/474 |
| 5,255,122 A | * | 10/1993 | Konuma et al. ....... 359/650 |
| 5,313,330 A | | 5/1994 | Betensky |
| 5,339,947 A | | 8/1994 | Campanile |
| 5,353,070 A | * | 10/1994 | Mitani et al. ......... 348/781 |
| 5,455,713 A | * | 10/1995 | Kreitzer ............. 359/649 |

(Continued)

FOREIGN PATENT DOCUMENTS

CN     1167793 A    12/1997

(Continued)

OTHER PUBLICATIONS

International Search Report (PCT/ISA/210) 6 pages.

(Continued)

*Primary Examiner*—David Ometz
*Assistant Examiner*—Jean W. Désir
(74) *Attorney, Agent, or Firm*—Sughrue Mion, Pllc.

(57) ABSTRACT

Provided are a projection optical system, a projection television, and a method of manufacturing a lens included in the projection optical system. The projection optical system includes lenses for projecting color beams onto a screen. A color filter layer, absorbing at least one of the color beams, is coated on the surface of at least one of the lenses.

15 Claims, 8 Drawing Sheets

U.S. PATENT DOCUMENTS

| | | | |
|---|---|---|---|
| 5,808,804 A * | 9/1998 | Moskovich | 359/649 |
| 5,933,280 A * | 8/1999 | Osawa et al. | 359/649 |
| 6,025,959 A * | 2/2000 | Moskovich | 359/649 |
| 6,115,081 A * | 9/2000 | Hirata et al. | 348/744 |
| 6,130,786 A * | 10/2000 | Osawa et al. | 359/649 |
| 6,141,154 A * | 10/2000 | Kreitzer | 359/651 |
| 6,239,917 B1 | 5/2001 | Tadic-Galeb et al. | |
| 6,262,840 B1 * | 7/2001 | Watanabe et al. | 359/453 |
| 6,411,444 B1 * | 6/2002 | Moskovich | 359/722 |
| 6,473,244 B1 | 10/2002 | Sungano | |
| 6,496,232 B1 * | 12/2002 | Shinobu | 348/825 |
| 6,509,937 B1 * | 1/2003 | Moskovich | 348/781 |
| 6,529,336 B1 * | 3/2003 | Kreitzer | 359/649 |
| 6,717,626 B1 * | 4/2004 | Kondo et al. | 348/756 |
| 6,791,629 B2 * | 9/2004 | Moskovich et al. | 348/779 |
| 6,864,961 B2 * | 3/2005 | Omura | 355/67 |
| 6,912,089 B2 * | 6/2005 | Nakagawa et al. | 359/599 |
| 7,019,793 B2 * | 3/2006 | Moskovich et al. | 348/779 |
| 7,081,927 B2 * | 7/2006 | Hirata et al. | 348/744 |
| 2002/0122016 A1 | 9/2002 | Iwasa et al. | |
| 2003/0043463 A1 | 3/2003 | Li et al. | |

FOREIGN PATENT DOCUMENTS

JP    2002-328430 A    11/2002

OTHER PUBLICATIONS

Chinese Patent Office Action dated Jun. 22, 2007.
Chinese Patent Action dated Jun. 1, 2007.

* cited by examiner

US 7,324,169 B2

PROJECTION OPTICAL SYSTEM, PROJECTION TELEVISION, AND METHOD OF MANUFACTURING LENS INCLUDED IN PROJECTION OPTICAL SYSTEM

BACKGROUND OF THE INVENTION

This application claims the priority of Korean Patent Application No. 2003-44250, filed on Jul. 1, 2003 and No. 2004-11330, filed on Feb. 20, 2004, in the Korean Intellectual Property Office, the disclosures of these documents are incorporated herein in their entirety by reference.

1. Field of the Invention

The present invention relates to a projection optical system including a color filter layer, a projection television adopting the projection optical system, and a method of manufacturing a lens included in the projection optical system.

2. Description of the Related Art

FIG. 1 is a cross sectional view of a projection lens system of a color television disclosed in U.S. Pat. No. 5,055,922. Referring to FIG. 1, the projecting lens system 10 includes a fixing device 12 fixed to a cathode ray tube (CRT) 9. The fixing device 12 forms an enclosure 13 that holds a coolant.

The projection lens system 10 includes a first lens 14, a second lens 15, a third lens 16, a fourth lens 17, and a fifth lens 18 arranged sequentially, each of which partially corrects aberration. The first lens 14 has a low magnification and aspherical surfaces on both sides. The first lens 14 may be composed of acryl. The second lens 15 is a biconcave lens composed of polyethylene plastics and partially corrects chromatic aberration. The third lens 16 is a power lens providing most of the magnification of the projection optical system and may be composed of glass. The fourth lens 17 is a correction lens and may be composed of acryl plastics. The fourth lens 17 may have aspherical surfaces on both sides to correct aberration and may have low magnification. The fifth lens 18, which is a field flattener, is used with a coolant and may be composed of acryl plastics.

When the CRT 9 is a green CRT, the fifth lens 18 acts as a color filter containing a color filtering material that transmits a green beam with a 550 nm wavelength and absorbs beams at other wavelengths.

It is suggested that one of the other lenses besides the fifth lens 18 may be a color filter. A lens acting as a color filter may be formed by spreading a color filtering material on the entire inner surface of the lens. Here, to homogenize chromatic purity, the lens must be manufactured with a uniform thickness by injection molding, which, however, increases the possibility of configuration error and increases manufacturing costs. Further, the configuration of the projection optical system becomes complicated because a lens acting as a color filter is additionally added to the projection optical system.

SUMMARY OF THE INVENTION

The present invention provides a projection optical system including a lens on which a color filter layer is formed in order to enhance color purity and image quality, a projection television adopting the projection optical system, and a method of manufacturing a lens on which a color filter layer is formed with a uniform thickness.

Consistent with an aspect of the present invention, there is provided a projection optical system including a plurality of lenses for projecting a plurality of color beams onto a screen. A color filter layer that absorbs at least one of the plurality of color beams, coated on the surface of at least one of the lenses.

Consistent with another aspect of the present invention, there is provided a projection television including a projection optical system including a cathode ray tube and a plurality of lenses projecting a plurality of color beams incident from the cathode ray tube onto a screen. A color filter layer absorbing at least one of the color beams is coated on the surface of at least one of the lenses.

Consistent with yet another aspect of the present invention, there is provided a method of manufacturing a lens for projecting a plurality of color beams onto a screen, wherein the lens is included in a projection optical system. The method includes installing the lens on a support and fixing the lens to the support with a vacuum absorber, dropping a coating material on the surface of the lens, rotating the support, and hardening the coating material. The coating material absorbs at least one of the color beams and may be an ultraviolet curing resin or a thermosetting resin.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
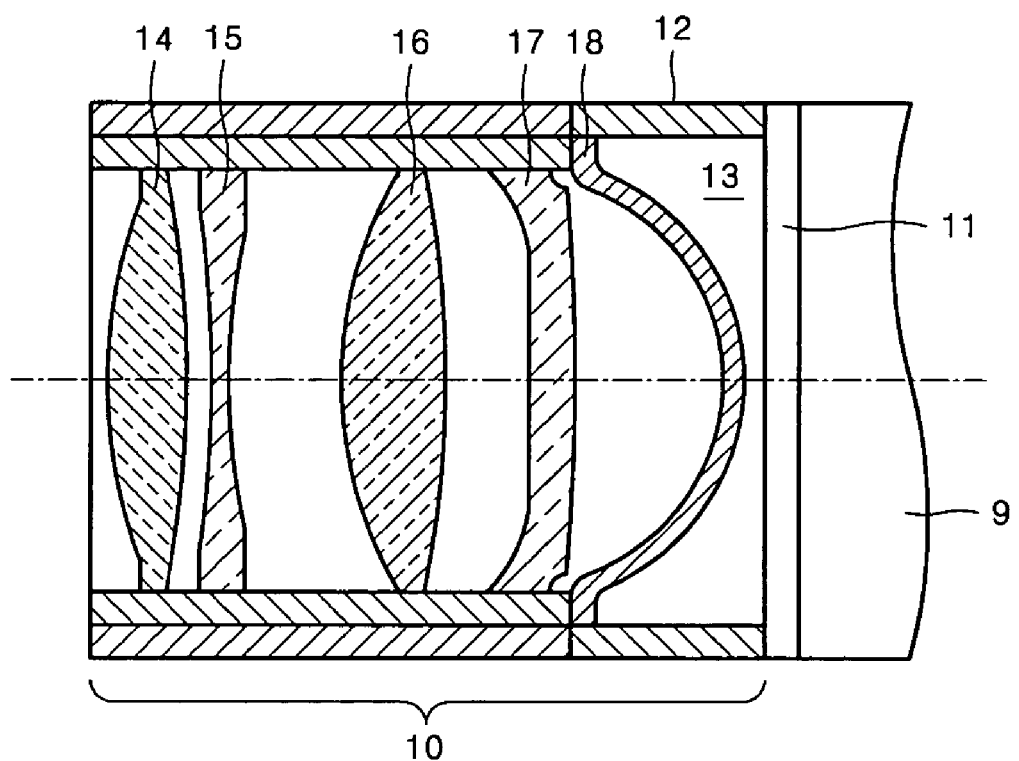
FIG. 1 is a cross sectional view of a projection lens system of a color television disclosed in U.S. Pat. No. 5,055,922.
Figure 2:
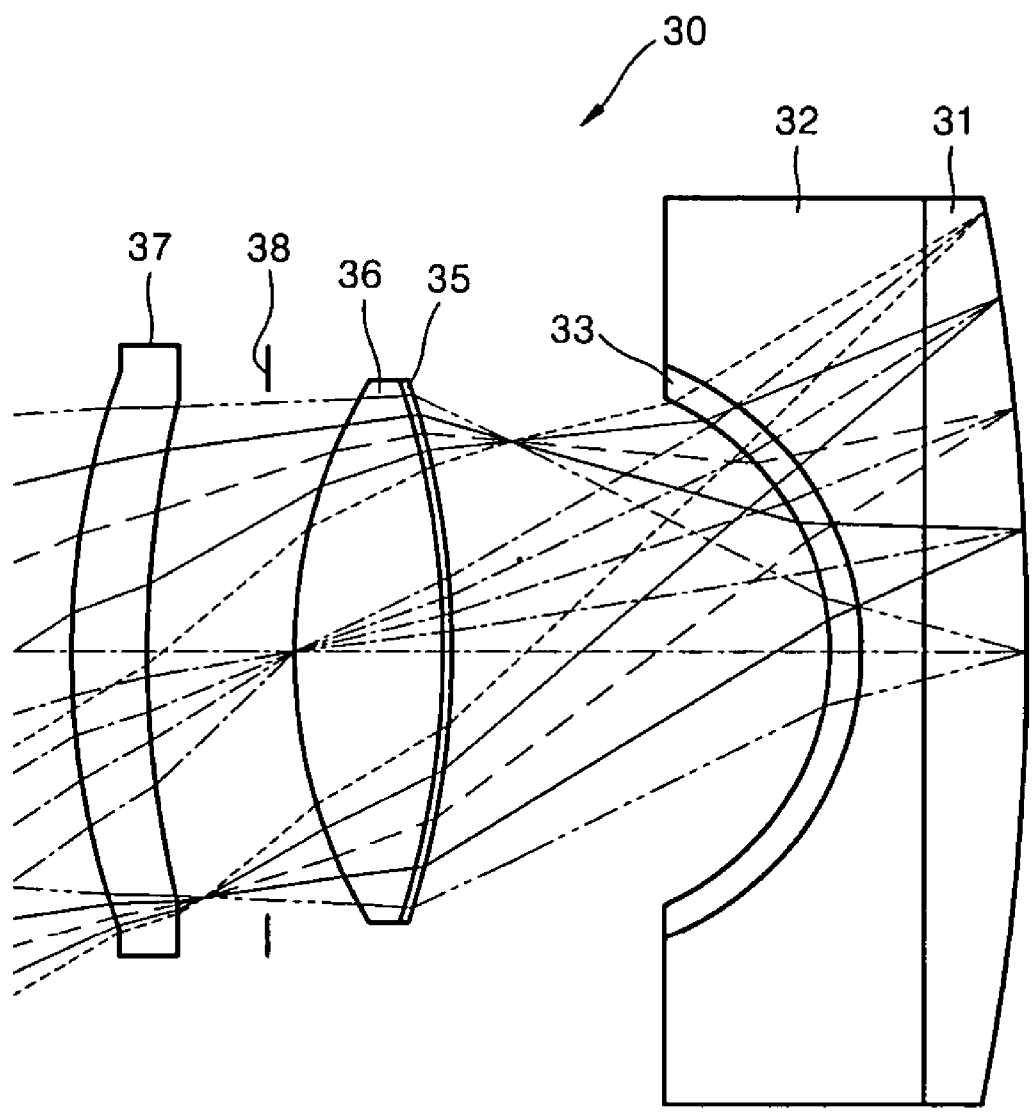
FIG. 2 is a schematic view of a projection optical system consistent with a first embodiment of the present invention.

FIG. 2 is a schematic view of a projection optical system 30 consistent with a first embodiment of the present invention.

Referring to FIG. 2, the projection optical system 30 consistent with the first embodiment of the present invention includes a protective lens 31, a coupler 32, a first meniscus lens 33, a biconvex lens 36, a color filter layer 35, and a second meniscus lens 37. The protective lens 31 covers a fluorescent surface of a display apparatus such as a cathode ray tube (CRT) that generates a plurality of color beams. The coupler 32 holds a coolant. The first meniscus lens 33 is connected to the coupler 32 and emits a plurality of color beams in a predetermined direction. The biconvex lens 36 refracts the plurality of color beams emitted from the first meniscus lens 33. The color filter layer 35 is formed on one side of the biconvex lens 36 and absorbs at least one of the plurality of color beams. The second meniscus lens 37 transmits the plurality of color beams at positions of desired pixels, thereby forming an image on a screen 7 (See FIG. 7). An aperture stop 38 blocks unnecessary beams.

A plurality of color beams emitted from the CRT are transmitted by the protective lens 31, the coupler 32 and the first meniscus lens 33. When the color beams pass through the color filter layer 35, some of the color beams are absorbed and filtered by dye contained in the color filter layer 35. The color beams filtered by the color filter layer 35 are refracted by the biconvex lens 36, some of the color beams are blocked by the aperture stop 38, and the remaining color beams pass through the second meniscus lens 37 and form an image on the screen 7 (See FIG. 7).

Functions of each optical device now will be briefly described one by one, starting from the device closest to the screen. The second meniscus lens 37 has a convex surface facing the screen. The second meniscus lens 37 corrects spherical aberration caused by a large aperture of a lens needed for a large screen. The second meniscus lens 37 can be aspherical.

The biconvex lens 36 magnifies an image incident from the CRT by a predetermined amount. The biconvex lens 36 can be composed of glass and can have high positive refractive power.

The first meniscus lens 33 has a concave surface facing the screen and a convex surface facing the CRT. The first meniscus lens 33 has negative refractive power, and corrects curvature of a field and distortion. The first meniscus lens 33 may be aspherical to better correct aberration.

Figure 3:
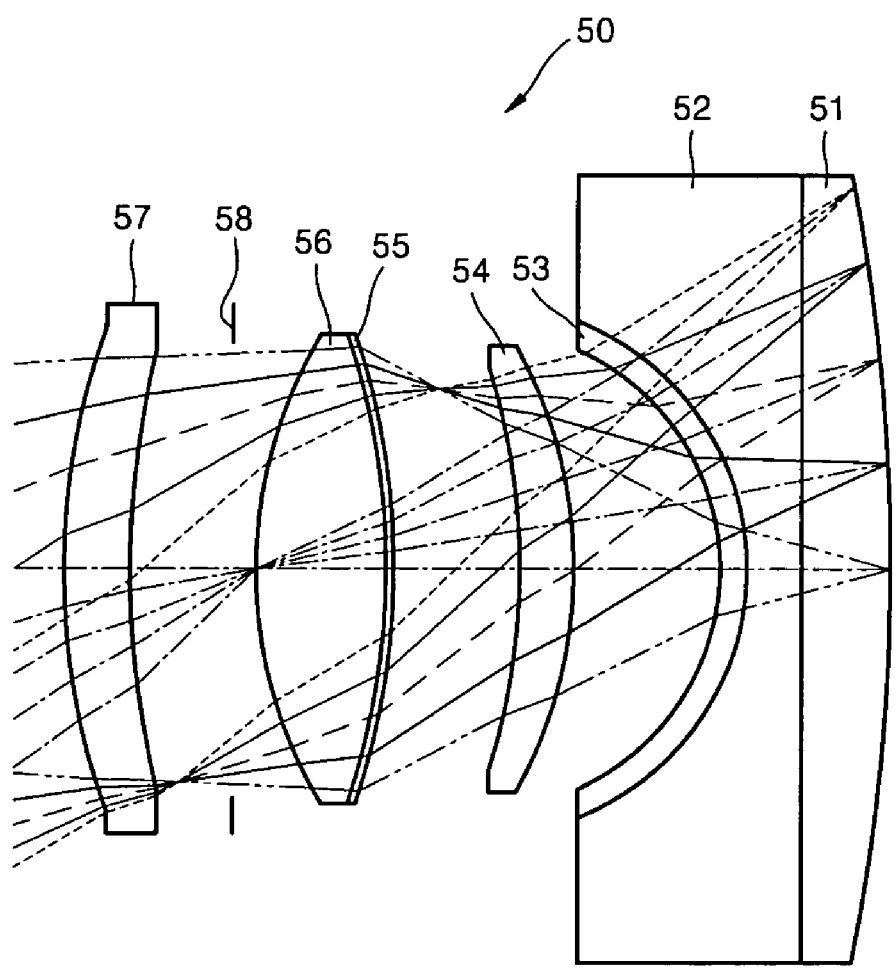
FIG. 3 is a schematic view of a projection optical system consistent with a second embodiment of the present invention.

FIG. 3 is a schematic view of a projection optical system 50 consistent with a second embodiment of the present invention. Referring to FIG. 3, the projection optical system 50 includes a protective lens 51, a coupler 52, a first meniscus lens 53, a correction lens 54, a biconvex lens 56, on a side of which a color filter layer 55 is formed, an aperture stop 58, and a second meniscus lens 57. Compared with the projection optical system 30 consistent with the first embodiment of the present invention, the projection optical system 50 consistent with the second embodiment of the present invention further includes the correction lens 54 interposed between the biconvex lens 56 and the first meniscus lens 53, thereby enhancing the efficiency of aberration correction of each color beam.

In the projection optical systems 30 and 50 of FIGS. 2 and 3, the color filter layers 35 and 55 may also be formed on the first meniscus lenses 33 and 53, the second meniscus lenses 37 and 57, and the correction lens 54.

Referring to FIGS. 2 and 3, the color filter layers 35 and 55 may include a predetermined dye to filter a predetermined color beam. In this case, the color filter layers 35 and 55 are not spread inside the biconvex lenses 36 and 56, but are coated on the outer surfaces of the biconvex lenses 36 and 56. Therefore, problems that can occur by injection may be prevented, and the biconvex lenses 36 and 56 do not need to have a uniform thickness.

A projection television using a CRT adopts a monochromatic CRT. Therefore, the projection television combines signals corresponding to beams of each color, that is, red, blue, and green, on a screen, and projects an image on a screen. In particular, since a green beam has a large effect on image quality, a green CRT mix dye (that filters red or blue beams but does not filter the green beam) may be contained in the color filter layer 35, thereby enhancing the transmittance of the green beam.

Figure 4:
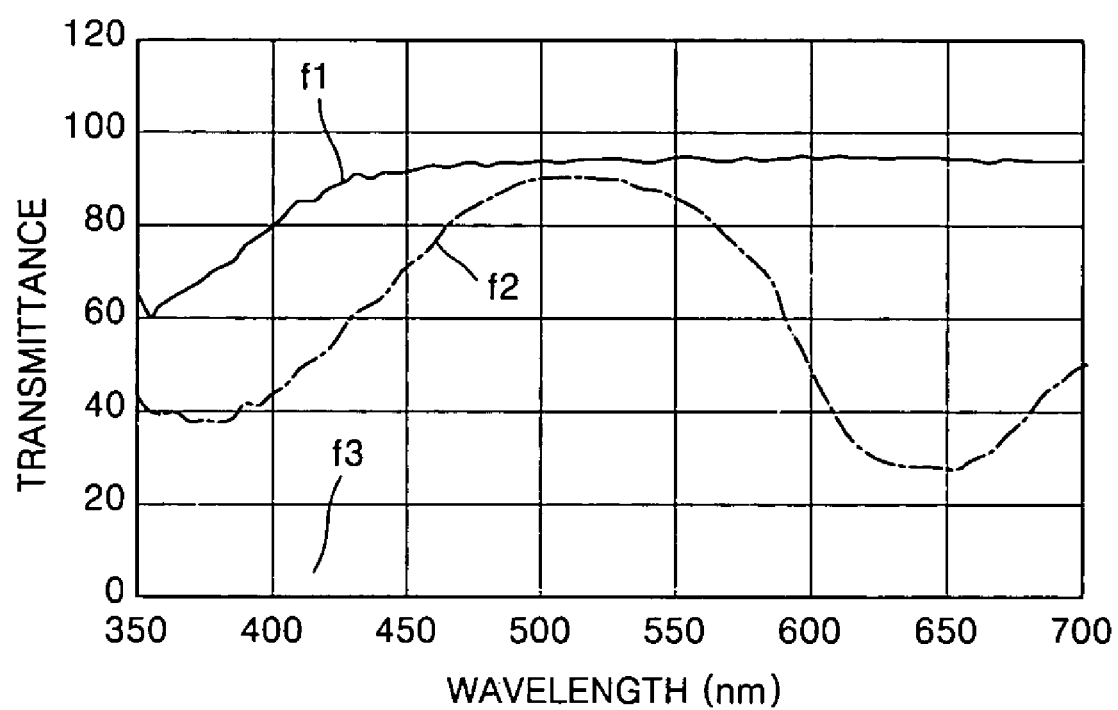
FIG. 4 is a graph illustrating transmittances by a variety of color filter layers that can be coated on an optical device of a projection optical system consistent with an embodiment of the present invention.

FIG. 4 is a graph illustrating transmittances by a variety of color filter layers that can be coated on an optical device of a projection optical system consistent with an embodiment of the present invention. Referring to FIG. 4: f1 indicates a case where there is approximately 90 percent transmittance in the 450 nm through 700 nm wavelength range; f2 indicates a case where there is more than 80 percent transmittance in the 460 nm through 550 nm wavelength range; and f3 shows more than 80 percent of transmittance in the greater than 600 nm wavelength range. Therefore, when transmitting mainly a green beam and filtering other color beams in other wavelength ranges, a color filter layer having the transmittance characteristic of f2, that is, a green filter layer, may be used. When transmitting mainly a red beam and filtering other color beams in other wavelength ranges, a color filter layer having the transmittance characteristic of f3, that is, a red filter layer, may be used.

Figure 5:
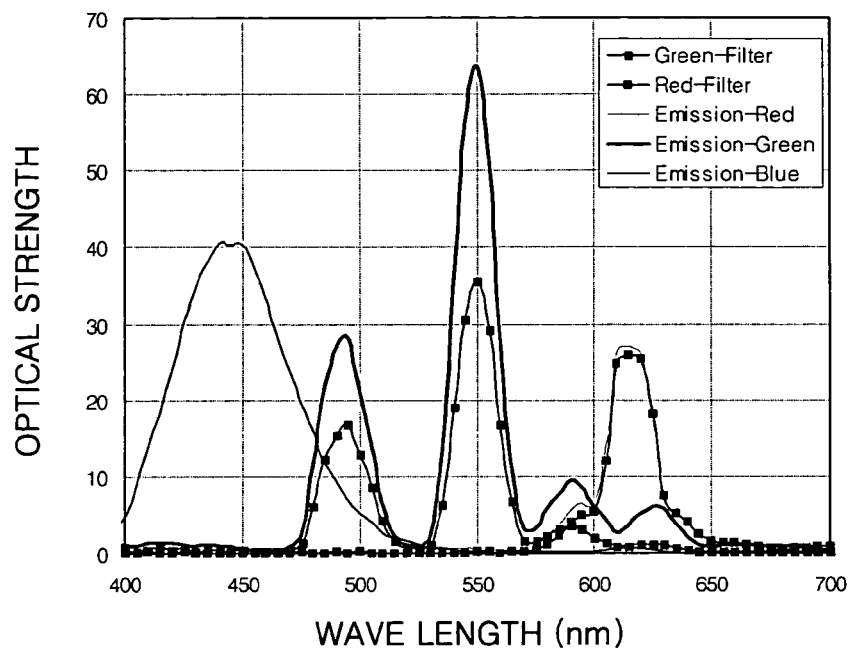
FIG. 5 is a graph illustrating filtering of red, green, and blue beams emitted from a cathode ray tube by a green filter layer and a red filter layer having the transmittance characteristics illustrated by FIG. 4.

FIG. 5 is a graph illustrating filtering of the red, green, and blue beams emitted from the CRT by the green filter layer f2 and the red filter f3 having the transmittance characteristics illustrated by FIG. 4. Referring to FIG. 5, of a plurality of color beams emitted by the CRT, the blue beam peaks in the 450 nm wavelength range, the green beam peaks in the wavelength range of 500 nm and 550 nm, and the red beam peaks in the 620 nm wavelength range. When the green filter layer f2 was used, optical strength at 500 nm dropped from a peak value of approximately 28 to approximately 17, and at 550 nm dropped from a peak value of 63 to approximately 35. In addition, when the red filter layer f3 was used, optical strength at 630 nm slightly decreased.

Figure 6:
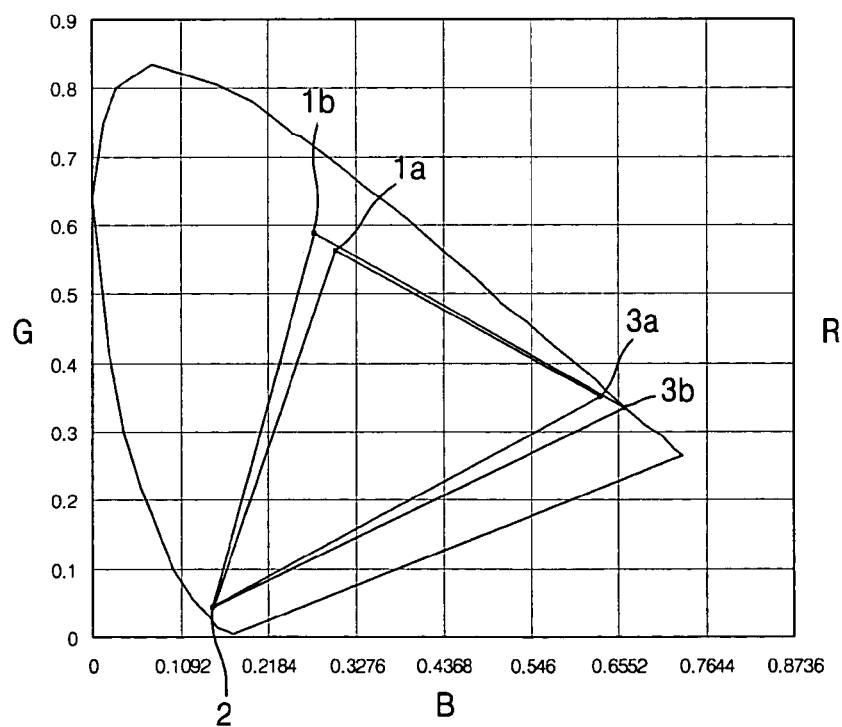
FIG. 6 is a graph illustrating CIE chromaticity coordinates of a projection optical system including a lens on which a color filter layer is formed consistent with an embodiment of the present invention.

FIG. 6 is a graph illustrating CIE chromaticity coordinates of a projection optical system including a lens on which a color filter layer is formed consistent with an embodiment of the present invention. Referring to FIG. 6, a point 1a indicates the chromaticity of a green beam emitted from the green CRT, a point 2 indicates the chromaticity of a blue beam emitted from the blue CRT, and a point 3a indicates the chromaticity of a red beam emitted from the red CRT. A triangle formed by connecting the points 1a, 2, and 3a indicates a color reproduction area before using a color filter layer. As shown in the CIE chromaticity coordinates, the closer to a point G the point 1a is, the better the purity of green. The closer to a point R the point 3a is, the better the purity of red, and the closer to a point B the point 2 is, the better the purity of blue.

After the color filter layer is used, the color reproduction area of the projection optical system expands to include the triangle connecting the points 1b, 2, and 3b. Since the point 1b is closer to the point G than the point 1a, the purity of green is improved. Since the point 3b is closer to the point R than the point 3a, the purity of red is also improved.

Figure 7:
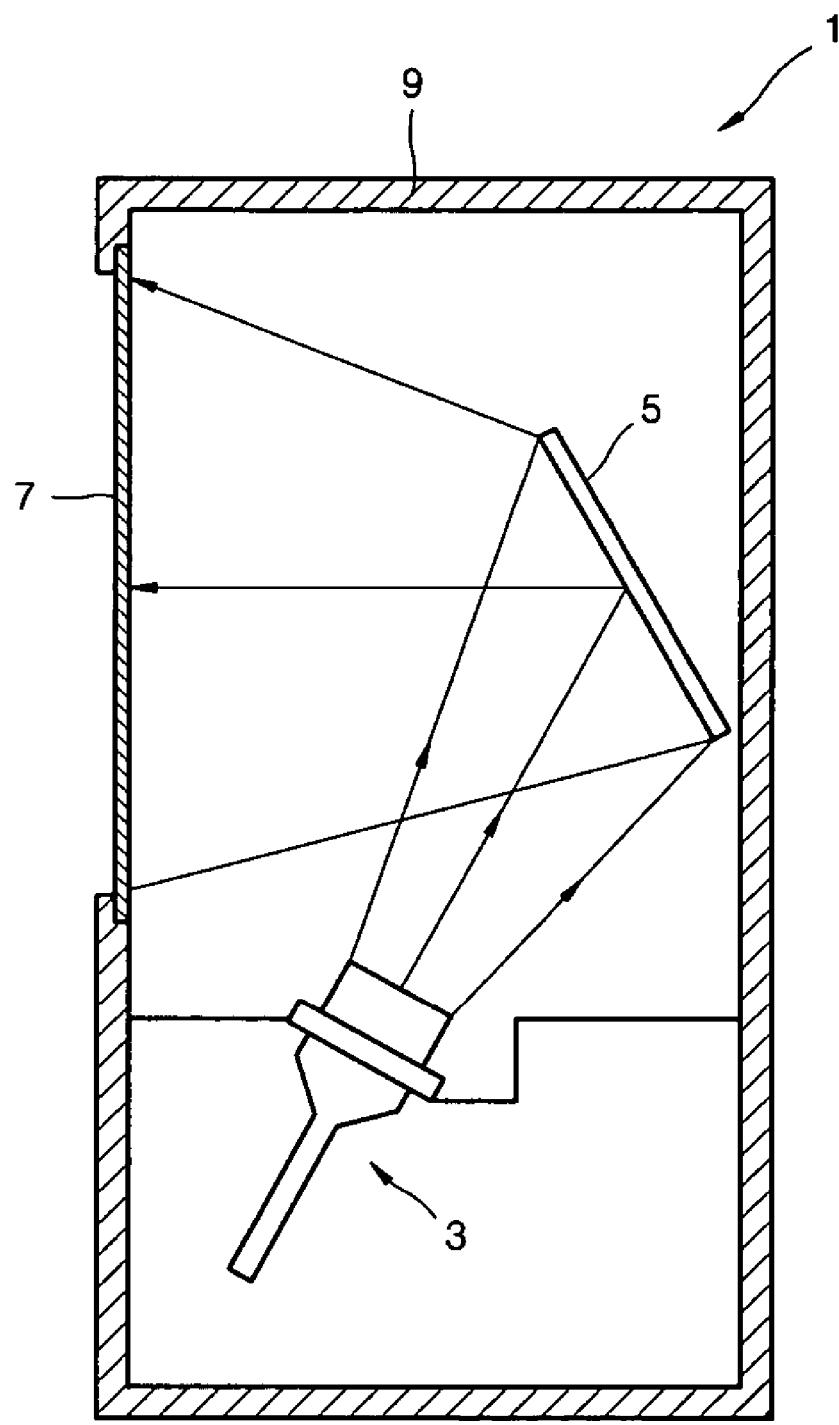
FIG. 7 is a schematic view of a projection television consistent with an embodiment of the present invention.

FIG. 7 is a schematic view of a projection television consistent with an embodiment of the present invention. Referring to FIG. 7, the projection television 1 consistent with the embodiment of the present invention includes a body 9, a CRT assembly 3 included in the body 9, and a reflecting mirror 5 reflecting a beam emitted from the CRT assembly 3 onto a screen 7. The CRT assembly 3 includes a CRT and a projection optical system 30 or 50 of FIG. 2 or 3 magnifying the beam emitted from the CRT by a predetermined amount. Here, any projection optical system including an optical lens having a color filter layer can be employed.

The projection optical systems 30 and 50 of FIGS. 2 and 3 consistent with embodiments of the present invention may enhance color purity and, at the same time, correct chromatic aberration caused by a color filter layer coated on the surface of a glass lens having a high refractive power. In addition, because of high color reproduction capabilities, the projection optical systems 30 and 50 may produce images with clearer colors. Even though the thickness of a coupler, a so-called C-lens, is not uniform, functional problems do not occur, thus giving a high degree of freedom in lens design. Hence, the configuration of a lens can be simplified.

Figure 9:
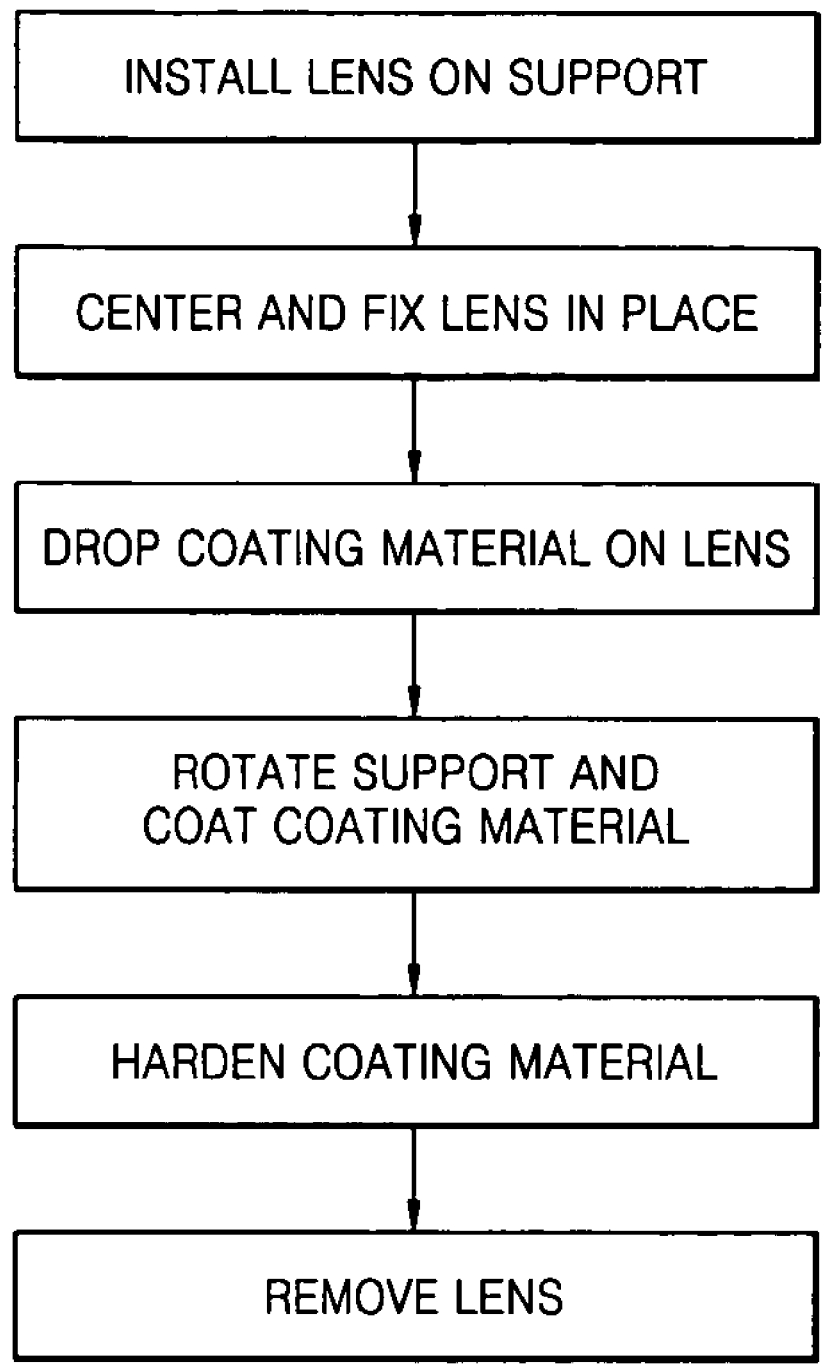
FIG. 9 is a flow chart illustrating a method of manufacturing a lens included in a projection optical system consistent with the present invention.

A method of manufacturing a lens included in a projection optical system consistent with an embodiment of the present invention will now be described. See FIG. 9.

A method of manufacturing a lens consistent with a first embodiment of the present invention includes forming a predetermined mold in which a glass lens is to be installed and coating a resin on the inner surface of the mold. The resin may be an ultraviolet (UV) curing resin such as a urethane acrylate resin or an epoxy acrylate resin. After installing the glass lens on the surface of the resin, UV rays are irradiated on the outer surface of the mold to harden the resin, thereby forming a color filter layer on the surface of the glass lens. The duration of irradiating UV rays is determined by the intensity of the UV rays and by the hardening characteristic of the resin. However, the UV rays can be irradiated for several minutes. When the color filter layer is hardened, the glass lens is removed from the mold. The molds can be mass-produced by using a plurality of copy molds copied from a master mold. The copy molds may be composed of special materials such that a resin used for a color filter layer adheres only to the glass. In this case, the color filter layer may be composed of a thermosetting resin instead of a UV curing resin.

A method of manufacturing a lens consistent with a second embodiment of the present invention includes coating a color filter layer on one side of a lens included in a projection optical system.

Figure 8:
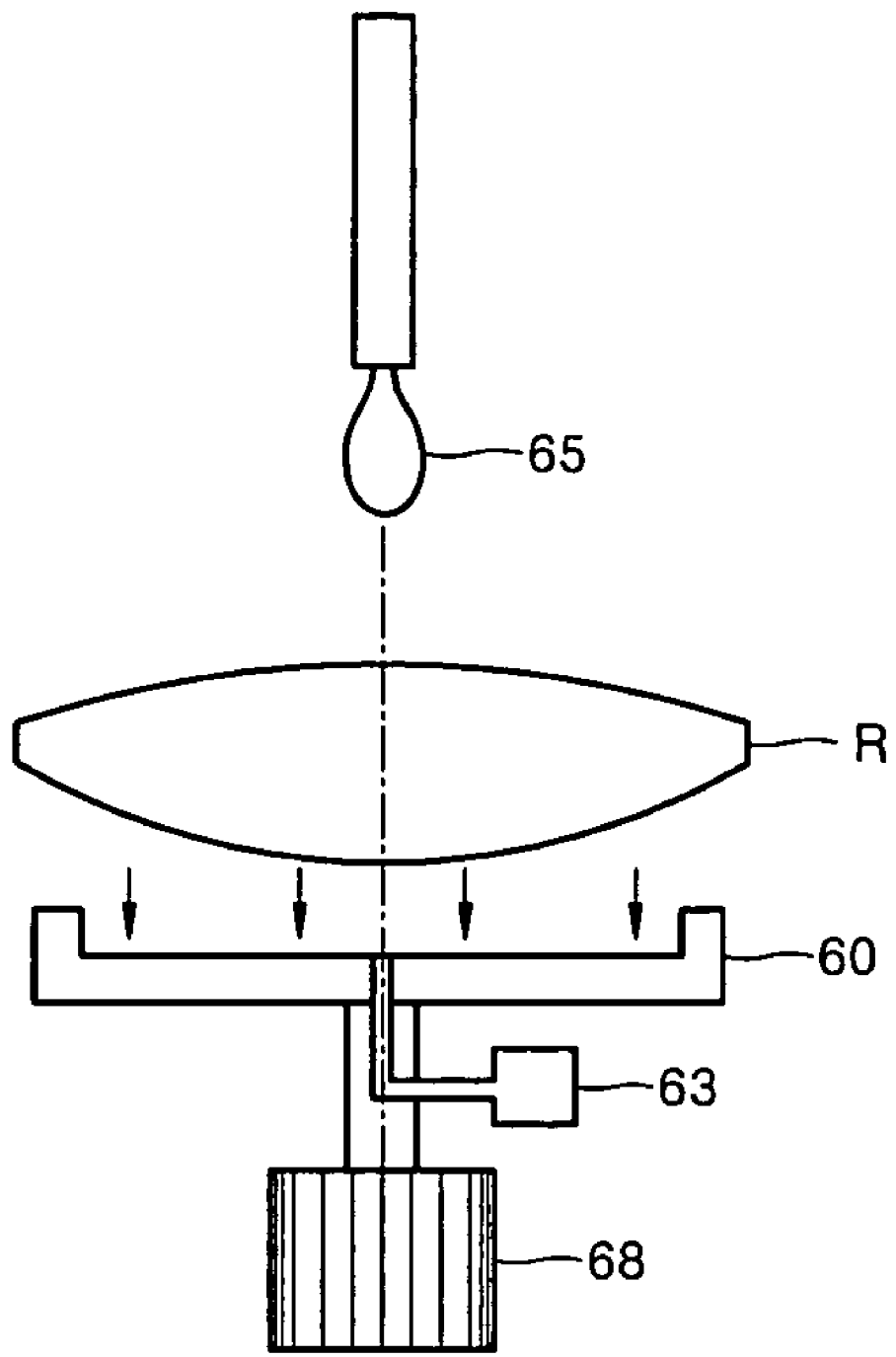
FIG. 8 is a schematic view of an apparatus for manufacturing a lens consistent with an embodiment of the present invention.

Referring to FIG. 8, a lens R, on which a color filter layer is to be coated, is installed on a support 60 and is fixed to the support 60 by a vacuum absorber 63. The vacuum absorber 63 includes a pump for creating a vacuum. Before fixing the lens R to the support 60, the lens R is centered to prevent it from being decentered in the support 60.

A coating liquid 65, containing a material absorbing light of a predetermined wavelength, is dropped on the surface of the lens R. The support 60 is rotated by driving a motor 68 while taking into consideration the characteristics of the coating liquid. Optimal rotational speed and acceleration are determined to form a coating layer with a uniform thickness. The coating layer may be coated on the front or rear surface of the lens R. It is preferable to arrange the lens R on the support 60 such that the surface of the lens R contacting the support 60 is not an effective surface.

The support 60 is rotated to evenly coat the coating liquid on the surface of the lens R. Then, the coating liquid is hardened by UV hardening or thermal hardening. In this way, a color filter layer can be coated to a uniform thickness on the surface of the lens R. The hardening time and the intensity of UV rays may be determined according to the characteristics of the coating liquid.

A UV curing resin such as a urethane acrylate resin, an epoxy acrylate resin, or a thermosetting resin, may be used as a color filtering material. In the present embodiment, a color filter layer is coated on the surface of the lens R using a simple spin coating method.

As described above, a projection optical system and a projection television adopting the same includes a color filter layer, thereby enhancing transmittance of a desired color and enhancing color purity. In other words, the color filter layer absorbs unnecessary wavelengths in a color emitting spectrum of a CRT, and therefore the color purity, contrast, and chromaticity of the screen of the projection television may be enhanced, thereby offering better image quality.

A method of manufacturing a lens included in the projection optical system consistent with embodiments of the present invention may include evenly coating a color filter layer on a surface of a lens using a spin coating method. The color filter layer may correct aberration of the lens and reduce chromatic aberration, thus improving color purity. Accordingly, a color reproduction area may be expanded and a quality image having high resolution may be formed.

Although the embodiments of the present invention have been described with reference to the accompanying drawings, it can be understood by those skilled in the art that the present invention can be implemented in the other specific forms without modifying or changing the technical spirit and essential features thereof. Therefore, it should be understood that the aforementioned embodiments are not restrictive but illustrative in all aspects. The scope of the present invention should be defined by the appended claims, and all changes or modifications made from the spirit and scope of the invention and equivalents thereof should be construed as falling within the scope of the invention.

What is claimed is:

1. A projection optical system comprising:
   a plurality of lenses projecting a plurality of color beams onto a screen; and
   a color filter layer, that absorbs at least one of the plurality of color beams, coated on a surface of at least one of the lenses;
   wherein a uniform thickness of the at least one of the lenses coated with the color filter layer is not required.

2. The projection optical system of claim 1, further comprising a cathode ray tube that is disposed adjacent to the plurality of lenses that generates the plurality of color beams.

3. The projection optical system of claim 1, wherein the plurality of color beams comprises a red beam, a green beam, and a blue beam.

4. The projection optical system of claim 1, wherein the color filter coating layer is composed of an ultraviolet curing resin or a thermosetting resin containing a material that absorbs a predetermined one of the plurality of color beams.

5. The projection optical system of claim 1, further comprising at least one of a meniscus lens having negative refractive power and a biconvex lens.

6. The projection optical system of claim 5, further comprising a correction lens operable to correct aberration.

7. The projection optical system according to claim 1, wherein the color filter layer is laid over the surface of the at least one of the lenses.

8. The projection optical system according to claim 1, wherein the color filter layer is coated on an outer surface of the at least one of the lenses.

9. A projection television comprising a projection optical system comprising:
   a cathode ray tube;
   a plurality of lenses projecting a plurality of color beams incident from the cathode ray tube onto a screen; and a color filter layer, that absorbs at least one of the plurality of color beams, coated on the surface of at least one of the lenses;

wherein a uniform thickness of the at least one of the lenses coated with the color filter layer is not required.

10. The projection television of claim 9, further comprising a coupler, holding a coolant, disposed in an optical path between the cathode ray tube and the projection optical system.

11. The projection television of claim 9, wherein the color filter coating layer is composed of an ultraviolet curing resin or a thermosetting resin containing a material that absorbs one of the plurality of color beams.

12. The projection television of claim 9, wherein the projection optical system further comprises at least one of a meniscus lens, having negative refractive power, and a biconvex lens.

13. The projection television of claim 12, wherein the projection optical system further comprises a correction lens operable to correct aberration.

14. A method of manufacturing a lens, for projecting a plurality of color beams onto a screen and for being included in a projection optical system, the method comprising:

installing the lens on a support and fixing the lens to the support with a vacuum absorber;

dropping a coating material on the surface of the lens and rotating the support, wherein the coating material absorbs at least one of the plurality of color beams; and hardening the coating material.

15. The method of claim 14, wherein the coating material is an ultraviolet curing resin or a thermosetting resin.

* * * * *